United States Patent
Hillaert et al.

(10) Patent No.: US 9,621,712 B2
(45) Date of Patent: Apr. 11, 2017

(54) METHOD FOR DEALING WITH ANOMALOUS CONDITIONS IN A REVERSE POWER NETWORK, AND POWER INJECTOR FOR USE IN SUCH A METHOD

(71) Applicant: Alcatel Lucent, Boulogne-Billancourt (FR)

(72) Inventors: Bart Hillaert, Putte (BE); Dirk Vanderhaegen, Wemmel (BE); Francois Fredricx, Antwerp (BE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/892,092

(22) PCT Filed: Jun. 12, 2014

(86) PCT No.: PCT/EP2014/062205
§ 371 (c)(1),
(2) Date: Nov. 18, 2015

(87) PCT Pub. No.: WO2014/202451
PCT Pub. Date: Dec. 24, 2014

(65) Prior Publication Data
US 2016/0100048 A1 Apr. 7, 2016

(30) Foreign Application Priority Data
Jun. 17, 2013 (EP) .................................... 13305811

(51) Int. Cl.
*H04M 3/22* (2006.01)
*H04B 3/44* (2006.01)
(Continued)

(52) U.S. Cl.
CPC ................ *H04M 3/22* (2013.01); *H04B 3/44* (2013.01); *H04B 3/46* (2013.01); *H04M 19/001* (2013.01); *H04M 19/08* (2013.01)

(58) Field of Classification Search
CPC .. H04M 19/005; H04M 19/001; H04M 19/08; H04M 3/22; H04M 3/2227; H04B 10/27; H04B 10/808
(Continued)

(56) References Cited

U.S. PATENT DOCUMENTS 8,818,192 B1 * 8/2014 Smith .................. H04B 10/808
398/171
2006/0291493 A1 12/2006 Schley-May et al.
(Continued)

FOREIGN PATENT DOCUMENTS

| JP | 2006521710 A | 9/2006 |
| JP | 2008529460 A | 7/2008 |
| KR | 101214686 B1 | 12/2012 |

OTHER PUBLICATIONS

International Search Report PCT/ISA/210 for International Application No. PCT/EP2014/062205 Dated Jul. 16, 2014.
(Continued)

*Primary Examiner* — Quoc D Tran
(74) *Attorney, Agent, or Firm* — Harness, Dickey & Pierce, P.L.C.

(57) ABSTRACT

Method for dealing with an anomalous condition in a local network including a power injector, said method comprising connecting the power injector to a communication line extending between the local network and a remote device, said power injector being capable of injecting power on the communication line, for reverse powering a remote device located outside the local network, and for powering any local device that is regularly connected to the communication line; said communication line being used for exchang-
(Continued)

ing data between the remote device and the local network; recognizing when a power consumption behavior of the power injector deviates from a characteristic power consumption behavior of said remote device and of any regularly connected local device; and controlling the power injector when a deviation is recognized.

11 Claims, 8 Drawing Sheets

(51) Int. Cl.
  *H04B 3/46* (2015.01)
  *H04M 19/08* (2006.01)
  *H04M 19/00* (2006.01)
(58) Field of Classification Search
  USPC .................................. 379/1.01, 32.01, 324
  See application file for complete search history.

(56) References Cited

U.S. PATENT DOCUMENTS

2010/0007334 A1    1/2010  Apfel
2010/0150556 A1*   6/2010  Soto .................. H04M 19/08
                                                         398/66

OTHER PUBLICATIONS

Written Opinion of the International Searching Authority PCT/ISA/237 for International Application No. PCT/EP2014/062205 dated Jul. 16, 2014.
Linear Technology. "LTC4259A Quad IEEE 802.3af Power over Ethernet Controller with AC Disconnect". Linear Techonology Corporation. 2003. pp. 1-32.
"Access, Terminals, Transmission and Multiplexing (ATTM); Reverse Power Feed for Remote Nodes," ETSI TR 102 629 V2.1.2 (Mar. 2011).

* cited by examiner

METHOD FOR DEALING WITH ANOMALOUS CONDITIONS IN A REVERSE POWER NETWORK, AND POWER INJECTOR FOR USE IN SUCH A METHOD

CROSS-REFERENCE TO RELATED APPLICATIONS

This application is a national phase under 35 U.S.C §371 of PCT International Application No. PCT/EP2014/062205 which had an International filing date of Jun. 12, 2014, which claims priority to European Application No. 13305811.5, filed Jun. 17,2013, the entire contents of each of which are hereby incorporated by reference.

FIELD OF INVENTION

The field of the invention relates to the powering of a remote device over a communication line between the remote device and a local network. Particular embodiments relate to the field of powering of a remote access equipment over copper line(s) between the access equipment and the local network.

BACKGROUND

Reverse power feeding is known. A controlled power source, called the "power injector", located at the customer premises injects power in reverse direction towards a remote device, typically a fibre-fed remote node, by re-using the same copper line which is also used for delivering a service by the fibre-fed remote node. Typically, the service is composed of a Broadband connectivity but may also include a POTS service (Plain Old Telephony Service). POTS adapters or other local devices may be connected to the copper line in the customer premises and may be powered by the power injector.

SUMMARY

Embodiments of the invention are based inter alia on the insight that, in the case of a typical simple home network, devices directly connected to the home network without an adaptor will be exposed to the full range of voltages and currents generated by the power injector, which can potentially pose a safety hazard. Indeed, such a device may be damaged and possibly start to smoke or catch fire.

Embodiments of the invention aim to detect such an anomalous condition, caused e.g. by a directly connected device without adaptor, and to protect them from being exposed to power or currents above an allowed range, e.g. above an allowed range for PSTN-connected devices. The most common case of a spurious device to be protected will be a PSTN-connected device (e.g. a phone, a fax or an alarm installation) that goes off-hook, but the invention is not limited to protecting PSTN-connected devices, and can also detect other anomalous conditions such as a short-circuit.

According to a first aspect of the invention there is provided a method for dealing with an anomalous condition in a local network, typically a home network, including a power injector. The method comprises connecting the power injector to a communication line extending between the local network and a remote device, said power injector being capable of injecting power on the communication line, for reverse powering a remote device located outside the local network, and for powering any local device that is regularly connected to the communication line. Note that "any" implies that there may be connected no local device, one local device or more than one local device to the communication line. The communication line is typically used for exchanging data between the remote device and the local network, and in particular for providing a service from the remote device to the local network, e.g. a broadband service and/or a POTS service. The method further comprises recognizing when a power consumption behavior of the power injector deviates from a characteristic power consumption behavior of said remote device and of any regularly connected local device; and controlling the power injector when a deviation is recognized.

In the context of the application a "local device that is regularly connected" refers to a device, such as an adaptor that is allowed to be directly connected to the communication line and that has a known power consumption behavior. The remote device is a device outside of the local network. If the remote device is an access equipment, the local network is typically a home network inside the customer premises, whilst the remote device may be outside of the customer premises, or in a basement of the customer premises, etc.

Embodiments are based inter alia on the inventive insight that a regularly connected device, e.g. a POTS adaptor for a PSTN-device, as well as the remote device are designed to not drain current or to drain only a low leakage current, when the voltage offered by the power injector is below a certain level; and to change the drain of current in a predefined way over time whenever a change in current is needed, when the offered voltage is above a certain level. In other words, the remote device and the regularly connected devices have a known "power over time" behavior, so that a deviation of this known behavior may be recognized, and the appropriate action for ensuring safety can be taken.

According to a preferred embodiment, controlling the power injector comprises ensuring that the injected power is below a predetermined level within a predetermined time period, e.g. within a time period smaller than 1 second. In that way, it can be guaranteed that any anomalous devices directly connected to the communication line draw too much power. In exemplary embodiments, the anomalous condition is caused by a communication device that is directly connected to the communication line on which the power is injected. Such a communication device may have an on-hook and an off-hook modus, wherein a deviation is recognized when the communication device is in the off-hook modus and draws power from the power injector. Such a communication device is e.g. a PSTN-device, such as a telephone, a fax, etc.

According to a preferred embodiment, a current and/or voltage and/or power behavior in the local network over time is measured, and wherein a deviation is recognized when a change over time of the current and/or voltage and/or power rises above a critical value. By measuring such a change a deviation can be recognized timely, allowing controlling the injected power appropriately.

Preferably the recognizing is done at the power injector. However, the recognizing could also be done at another point on the communication line.

In preferred embodiments, the remote device is a fibre-fed remote node. Typically, the communication line is a metallic-pair cable, preferably a copper-pair cable, e.g. a twisted pair or a coax cable. Preferably, communication signals including broadband signals and/or converted POTS signals are exchanged through said communication line, between the remote device and the local network. In exemplary embodiments, communication signals including POTS signaling adapted by a POTS adaptor in the remote device/the local network are exchanged through said communication line between a POTS adaptor in the remote device and a POTS adaptor in the local network.

In preferred embodiments, the power injector monitors the variation over time, typically the derivative, of the injected current or power for recognizing a deviation. Typically, the recognizing is performed during start-up of the power-injector, and the controlling comprises not allowing a startup of the power injector to full power; and/or the recognizing is performed during normal operation of the power-injector, and the controlling comprises limiting the injected power to predetermined safe values.

According to a further developed embodiment the method further comprises, at the power injector: receiving information concerning the power needed by the remote device, from the remote device; and taking into account said information for recognizing when a power consumption behavior of the power injector deviates from a characteristic power consumption behavior of said remote device. In an exemplary embodiment a remote access node may advertise power consumption statistics to the power injector, and the power injector may use these statistics to detect the anomalous condition. For instance, if there is needed a power ramp-up at the remote access node over a particular subscriber line on account of another line being switched off, then a power advertisement message could proactively signal the required power increase, and the power injector would not detect such a power/current rise as an abnormal situation.

According to another aspect of the invention, there is provided a power injector configured for injecting power on a communication line extending from a local network to a remote device. The power injector is configured for providing power through said communication line to said remote device, and to any local device connected regularly to said communication line in the local network. The power injector is further configured for recognizing when a power consumption behavior of the power injector deviates from a characteristic power consumption behavior of said remote device and of any regularly connected local device; and for controlling the power injected by the power injector when a deviation is recognized. Such a power injector may be used both in a local network where there are no local devices that are regularly connected to the communication line, as well as in a local network where there are local devices that are being regularly powered through the communication line.

Preferably, the power injector is configured for controlling the power injected such that it is ensured that the injected power is below a predetermined level within a predetermined time period.

Preferably, the power injector is configured for measuring a behavior of the injected current and/or voltage and/or power over time, and for recognizing a deviation when a change over time of the current and/or voltage and/or power rises above a critical value. Typically it will be sufficient to monitor e.g. only the current behavior, but the skilled person understands that also other electrical measures may be used.

Preferably, the power injector is configured for performing said recognizing during start-up of the power-injector, and for not allowing a startup of the power injector to full power if a deviation is recognized; and/or for performing said recognizing continuously during normal operation of the power-injector, and for limiting the injected power to predetermined safe values when a deviation is recognized. Under the term continuously is meant that a plurality of measurements per second are performed, said measurements being such that a deviation can be recognized from said measurements.

According to a further developed embodiment the power-injector is configured for receiving from the remote device information concerning the power needed by the remote device; and for taking into account said information for recognizing when a power consumption behavior of the power injector deviates from a characteristic power consumption behavior of said remote device.

According to yet another aspect of the invention, there is provided a system comprising a plurality of local networks, a remote device, typically a fibre-fed node, outside said plurality of local networks and connected to said plurality of local network through a plurality of communication lines, and, in at least one local network of said plurality of local networks, a power injector according to any one of the embodiments disclosed above. The power injector is connected to the communication line of the concerned local network. The remote device is configured for providing data to said plurality of local networks through said plurality of communication lines, wherein each communication line is preferably a metallic-pair cable, more preferably a copper-pair cable. The remote device may be configured for providing a service, e.g. a broadband service and/or a POTS service, to each local network.

Yet another aspect of the invention provides a method for detection and protection of one or multiple spurious connected devices in the context of a home network being shared for broadband services, POTS service, and reverse powering of the remote. The method allows the power injector to continuously (=at start-up and during operational mode) distinguish genuinely connected local or remote devices from spurious connected devices by recognizing a deviation from the characteristic power consumption behavior of the genuine connected devices. A deviation from this known power consumption behavior indicates the presence of one or multiple spurious devices, and may trigger the protection, e.g. the power injector may back off to safe current and voltage values, or may be switched off. Typically, the distinction between allowed and deviating current/power consumption is based on the genuine devices exhibiting a controlled current variation over time.

According to another aspect of the invention there is provided a method for dealing with an anomalous condition in a network including a power injector, said method comprising connecting the power injector to a communication line of the network, said power injector being capable of injecting power on the communication line, for powering at least one device that is directly and regularly connected to the communication line; said communication line being used for transmitting data to/from said at least one device; recognizing when a power consumption behavior of the power injector deviates from a characteristic power consumption behavior of said at least one device; and controlling the power injector when a deviation is recognized. According toa similar aspect there is provided a power injector configured for injecting power on a communication line; said power injector being configured for providing power through said communication line to at least one device connected regularly to said communication line; said power injector being further configured for recognizing when a power consumption behavior of the power injector deviates from a characteristic power consumption behavior of said at least one device; and for controlling the power injected by the power injector when a deviation is recognized. Such embodiments of the invention allow protecting a device that is spuriously connected to the communication line or a short-circuit, since this will cause a deviation of the known power consumption behavior of the at least one regularly connected device. Such embodiments can be used in the context of reverse powering but also in the context of local powering without reverse powering.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF EMBODIMENTS

Embodiments of the invention relate in particular to the powering of a broadband access equipment remotely installed in the field and close to customer premises, delivering a broadband service of some sort to the customer premises over copper line(s). More generally embodiments of the invention relate to the powering of a remote device over a communication line between the remote device and the customer premises, which communication line is also used for exchanging communication signals, e.g. xDSL signals between the remote device and the customer premises equipment. The considered powering method is a so-called "reverse power feeding", meaning that a controlled power source, called the "power injector", at the customer premises will inject power in reverse direction towards the remote device, by re-using the same copper line which is also used for delivering the service. Typically, the service is composed of a Broadband connectivity but may also include a POTS service (Plain Old Telephony Service). The copper line is typically a twisted pair, but the same service(s) could alternatively be transported over a coax cable.

According to an embodiment, to make the reverse power compatible with the POTS service, the POTS DC powering and low-frequency signaling has to be decoupled from the line. To that end, the remote may include a POTS adapter to convert the DC and low-frequency signaling into an adapted signaling that can co-exist with the broadband signals and the reverse DC powering. A similar POTS adapter device, which may be implemented into a dongle, is then provided in front of every telephone or other device in the home network to regenerate the POTS DC powering and low-frequency POTS signaling from the adapted signaling. Such a POTS adaptor will also protect its attached device(s), such as a phone, a fax, etc. from voltages and currents generated by the power injector which may be higher than allowed by such a device. According to alternative embodiments, the POTS may be reformatted into a digital signal which is restored at a CPE at the customer premises. According to yet another embodiment, POTS may be provided as VoIP, and the CPE may represent the voice service on a separate interface as an analogue presentation via an Analogue Terminal Adaptor (ATA) or directly to a VoIP handset. According to a variant, the CPE is provided with VoIP and comprises a POTS adaptor for generating a suitable signal that can be reinjected in the local network, see FIG. 5 which is discussed below. See also ETSI TR 102 629 V2.1.2 (2011-03), entitled "Access, Terminals, Transmission, and Multiplexing (ATTM); Reverse Power Feed for Remote Nodes", section 4.8.

Figure 6:
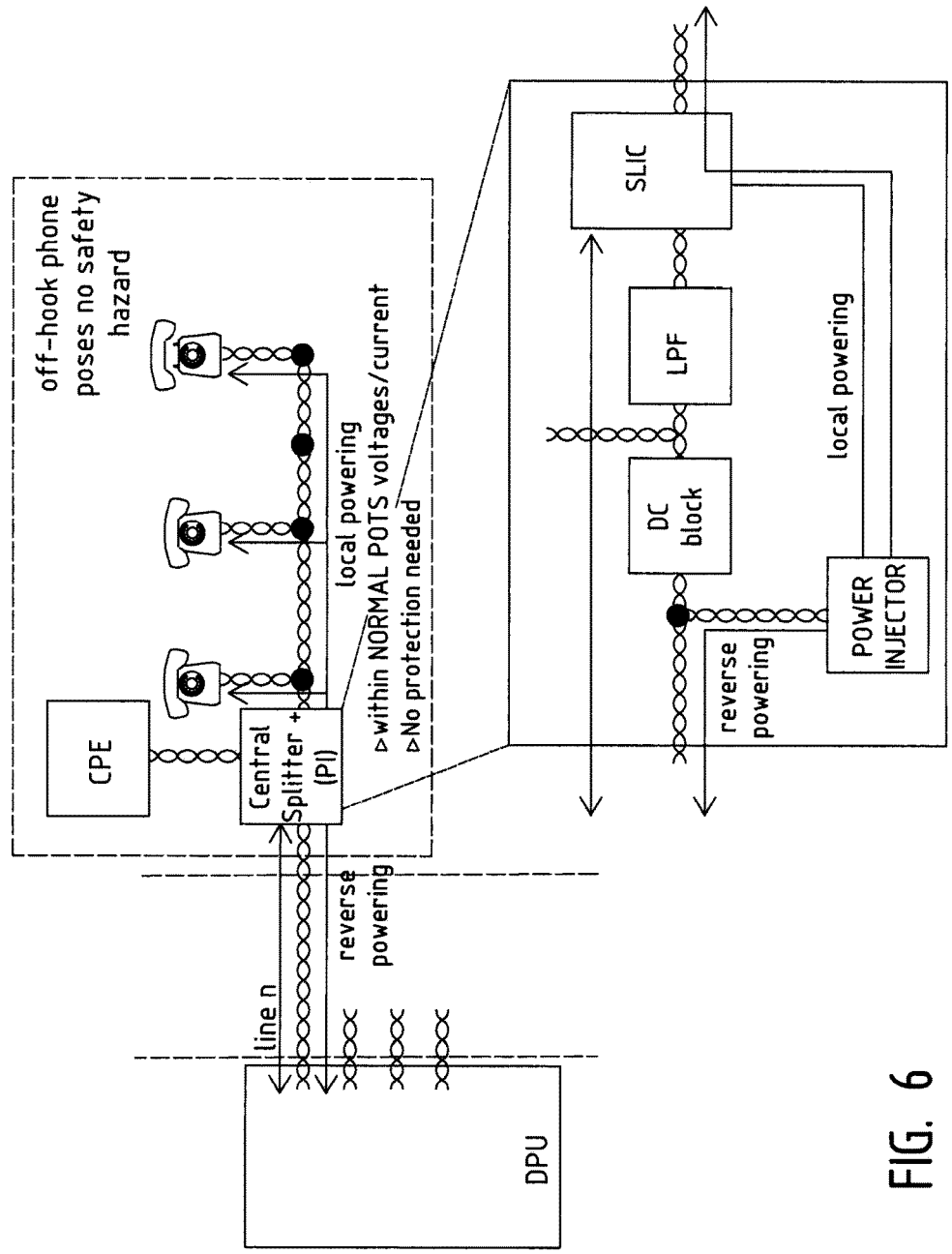
FIG. 6 illustrates schematically a prior art embodiment of a system.

A typical prior art system is illustrated in FIG. 6. In such a system there is provided a Central PI Splitter between the part of the communication line that is connected to the distribution point unit "DPU" and the part of the communication line that is connected to local devices, such as phones. The central PI splitter has a first output for injecting the reverse power, and a second output for injecting local power. The power used for reverse powering is internally blocked to the local devices. The power provided to the local devices is limited by a suitable component, here the Subscriber Line Interface Circuit "SLIC". In such a prior art system, there is needed a central splitter, i.e. a point separating the power injected reversely and the power injected locally. In the case of a hub-and-spoke home cabling network, i.e. a home network without a point to separate the public network side and the home network side, devices directly connected to the home network without an adaptor will be exposed to the full range of voltages and currents generated by the power injector. This can potentially pose a safety hazard. Indeed, such a device may be damaged and possibly start to smoke or catch fire.

Embodiments of the invention aim to detect such spurious connected device without adaptor and to protect them from being exposed to power or currents above an allowed range, e.g. an allowed range for PSTN-connected devices. The most common case of a spurious device to be protected will be a PSTN-connected device (e.g. a phone, a fax or an alarm installation) that goes off-hook, but the invention is not limited to protecting PSTN-connected devices.

Typically, traditional current/voltage/power protective methods are static. The current or voltage or power is then detected or measured, and a protection device is activated when a certain value is exceeded. However, in the situation set out above, the protection method cannot rely on a static value, as a given value can either be acceptable or unacceptable depending on the amount and instant consumption of the remote device and of any local genuine devices, typically the adaptors, that are powered by the power injector and the unknown number and instant behavior of spurious devices. Moreover, the presence of connected home devices (genuine and spurious) is totally unpredictable, as they may be already present before the power injector gets connected, or they may get attached/detached at any moment after the power injector has already been activated.

According to embodiments of the invention, there is provided a method to dynamically, preferably continuously over time, monitor for the presence of spurious connected devices and take protective action whenever such a device is detected. This monitoring is able to differentiate the spurious devices from the genuinely connected adaptors and from the remote device.

Power over Ethernet (PoE, IEEE 802.3af, IEEE 802.3at) has a resistance-measurement based signaling between the source and the powered device to allow the presence of a conformant device to be detected by the power source, and the device and source to negotiate the amount of power required or available. PoE only works on a point-point link between two devices and only at start-up. According to embodiments of the invention, the power injector has to differentiate any non-conformant device from an unknown number of conformant devices already connected in parallel and already being powered and with varying individual power consumptions.

Figure 1:
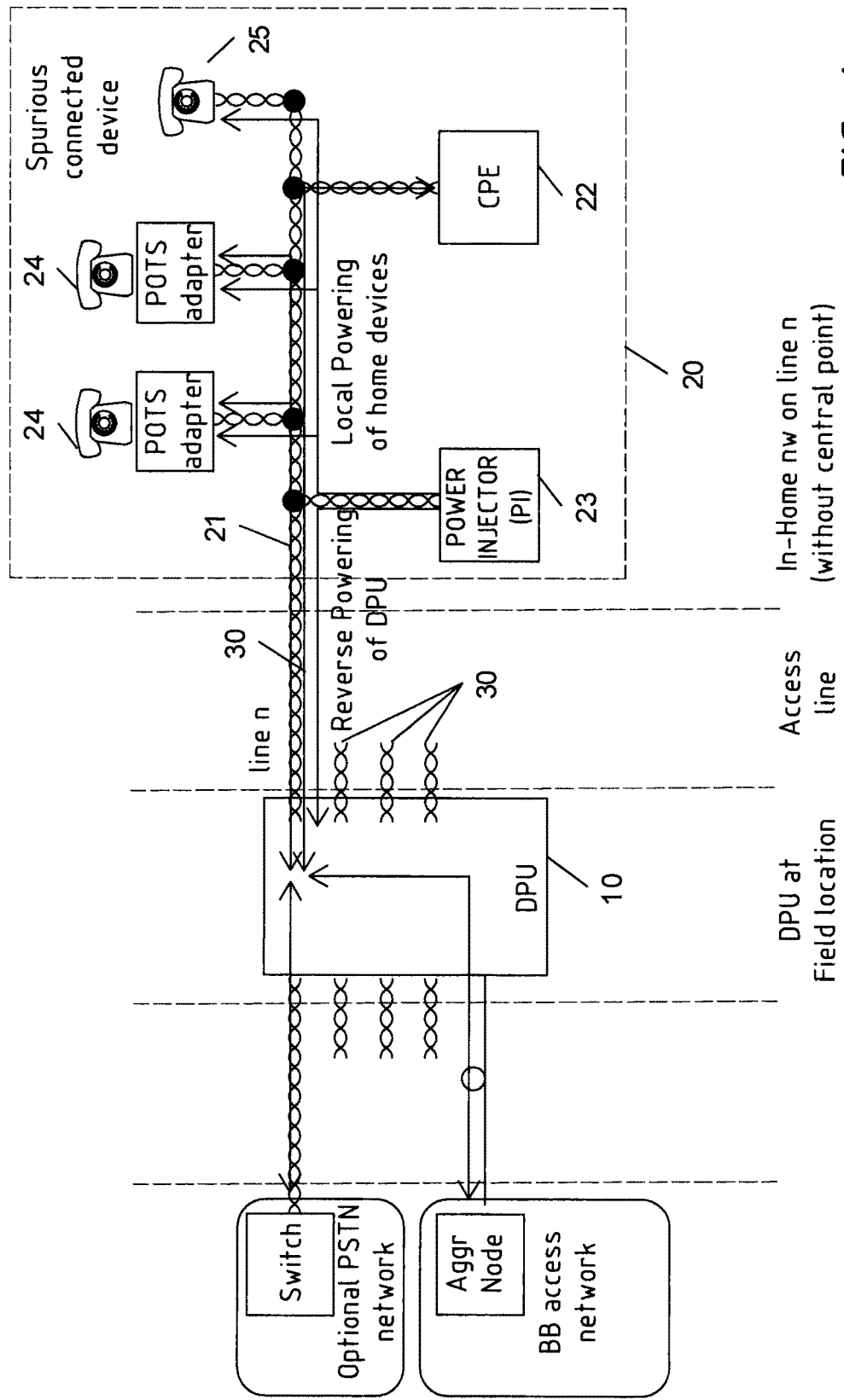
FIG. 1 illustrates schematically an environment in which embodiments of the invention may be used.

FIG. 1 illustrates an example of a typical reverse power feeding set-up. The set-up includes a remote device 10 to be powered, here a Distribution Point Unit (DPU) in the field. Typically, the remote device 10 to be powered is a fibre-fed remote node either located at the distribution point (DP) or at the cabinet. The set-up further comprises a plurality of home networks 20 supporting reverse powering, each home network 20 being connected with the remote device 10 through an access line 30. For clarity purposes only one home network 20 is shown. The home network 20 comprises at least one transmission line 21, typically a copper pair, and connected to said at least one transmission line 21: a customer premises equipment (CPE) 22 for receiving a broadband service, a power injector (PI) 23 for injecting power on the transmission line 21, an amount of regularly connected devices 24, such as POTS adapters with PSTN devices attached to them, and possibly one or more anomalous or spurious devices 25. The access line 30 and the line 21 are typically formed a single communication line, preferably a copper-pair.

In the illustrated set-up the PI 23 can deliver so-called "reverse" power to the DPU 10 via the access line 30 corresponding with the local network 20, and local power for home devices, such as the POTS adaptors with PSTN devices 24. The PI 23 is provided with a mechanism to detect the presence of spurious connected devices, of a short-circuit, or of any other fault condition, preferably at any time. Upon such detection, the PI 23 triggers a protective back-off action until the fault condition disappears.

Embodiments are based inter alia on the inventive insight that a regularly connected device 24, and in particular the POTS adaptor thereof, as well as the DPU 10 are designed to not drain current or to drain only a low leakage current, when the voltage offered by the PI is below a certain level; and to change the drain of current in a predefined way over time whenever a change in current is needed, when the offered voltage is above a certain level. In other words, the DPU 10 and the regularly connected devices 24 have a known "current over time" behavior whenever they start-up or require a change in current, so that the derivative of the current over time (dI/dt) is a good measure for checking if only regularly connected devices 24 and/or a DPU 10 are being powered by the PI 23.

In preferred embodiments, the power injector 23 constantly monitors the change of its electrical characteristic over time—this may be current variations and/or voltage variations—to distinguish between a valid device, i.e. a regularly connected device 24 or a DPU 10, ramping up in a controlled way, and hence justifying extra current drainage, and a spurious connected device 25 demanding an uncontrolled peak of extra current. When such invalid/abnormal changes are detected, the PI 23 reverts to safe voltage/current values.

Figure 2A:
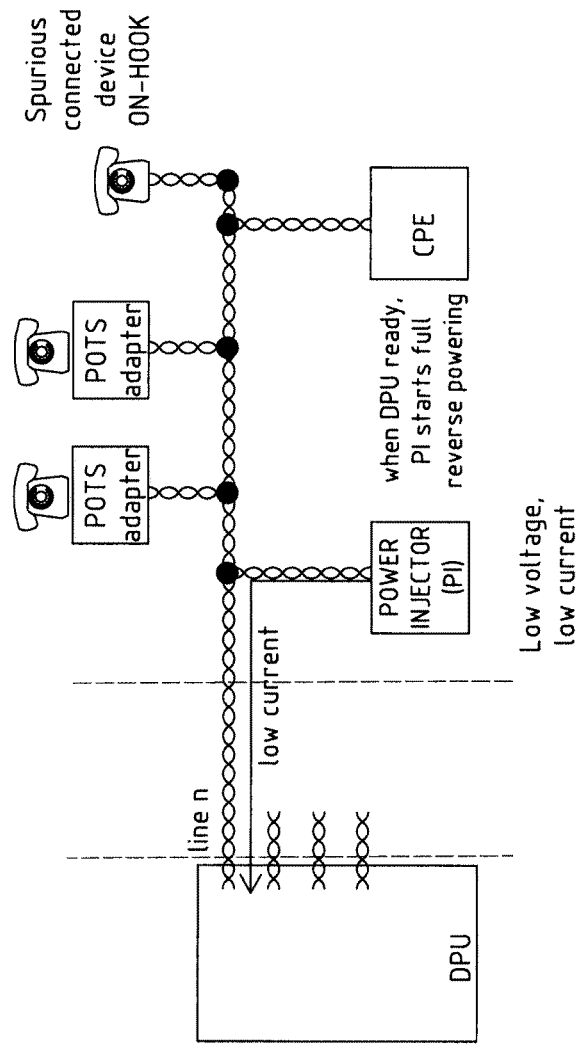
FIGS. 2A, 2B, 3A, and 3B illustrate schematically a first embodiment of a method and system in a start-up mode and in a normal operation mode, respectively.
Figure 2B:
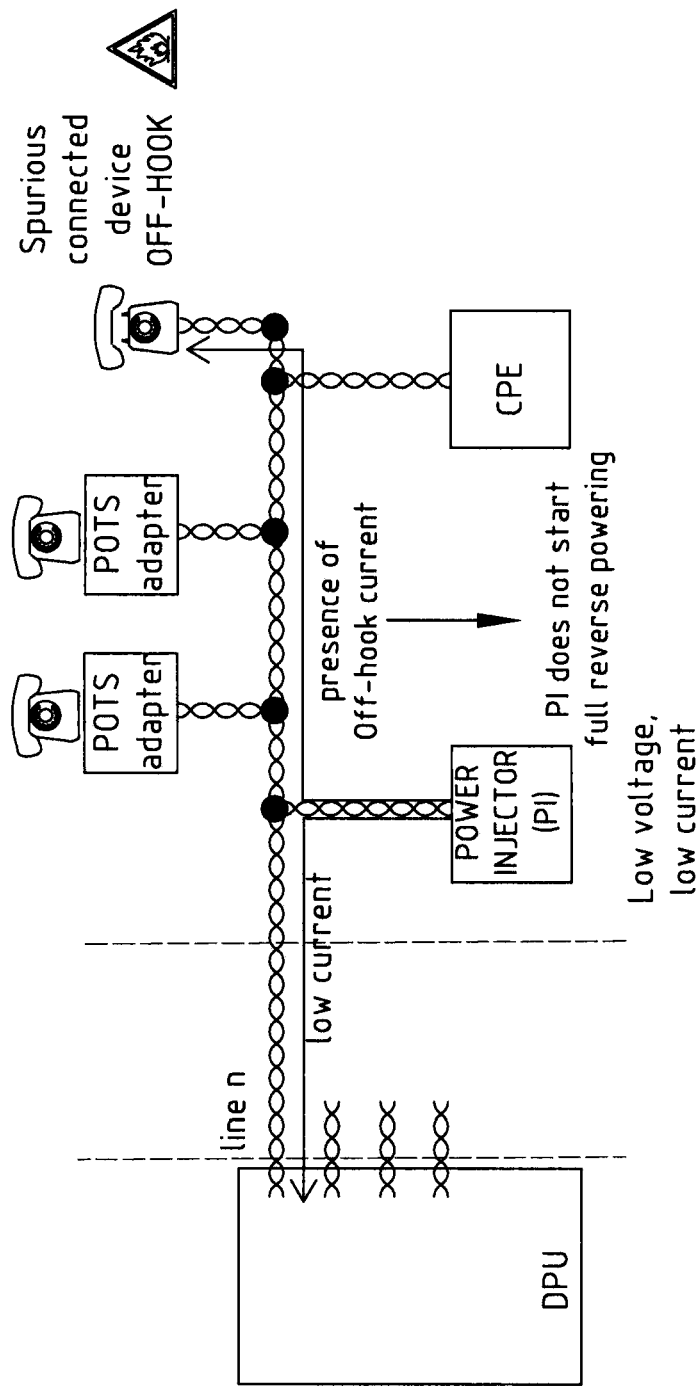

FIG. 2 illustrates in detail a start-up phase of reverse powering, i.e. a situation in which the PI 23 is activated. The PI 23 will start up with limited voltage/power, i.e. in a zone that is safe for any anomalous devices 25 that might be connected to the home network, and in particular in a zone that is safe for a POTS phone. The regularly connected devices 24 and the DPU 10 will only drain a very small current at this limited voltage/power.

As an example, it will now be assumed that the anomalous device 25 is a device that can be in an on-hook and an off-hook situation, such as a POTS phone, a fax, a modem, an answering machine, an alarm, etc. In a first situation, it is assumed that the connected device 25 is in an "on-hook" situation, see scheme (a) of FIG. 2. An on-hook device does not take current from the line and does not need to be detected. Indeed, there is no danger for fire/destruction as the phone is on-hook and can have higher voltages than what the power injector is capable of inserting. In such a situation, the PI 23 only delivers a small current enough for the DPU 10 to wake up in case the home network 20 is the first home network that powers the DPU 10, and to prepare for being powered on and for notifying back to the PI 23 that it is ready. After having received this notification from the DPU 10, the PI goes into full reverse power feeding mode. The DPU 10 and the regularly connected devices 24 will drain current in the controlled way.

In a second situation, it is assumed that the anomalous connected device 25 is in an off-hook situation. The PI 23 detects an off-hook device by measuring the DC current, as the regularly connected devices 24 and the DPU 10 are not allowed to react on the low voltage/power of the startup phase. When an off-hook device is detected, the PI 23 does not start-up to full power mode. Optionally, it may signal that the off-hook device 25 should be disconnected, e.g. in case of a phone by means of a howler tone or a message that this is a spurious connection. The PI 23 may then be reinitialized and will retry to start-up at a later moment. Typically, the start-up will only succeed when the off-hook device 25 goes on-hook again or is disconnected.

Figure 3A:
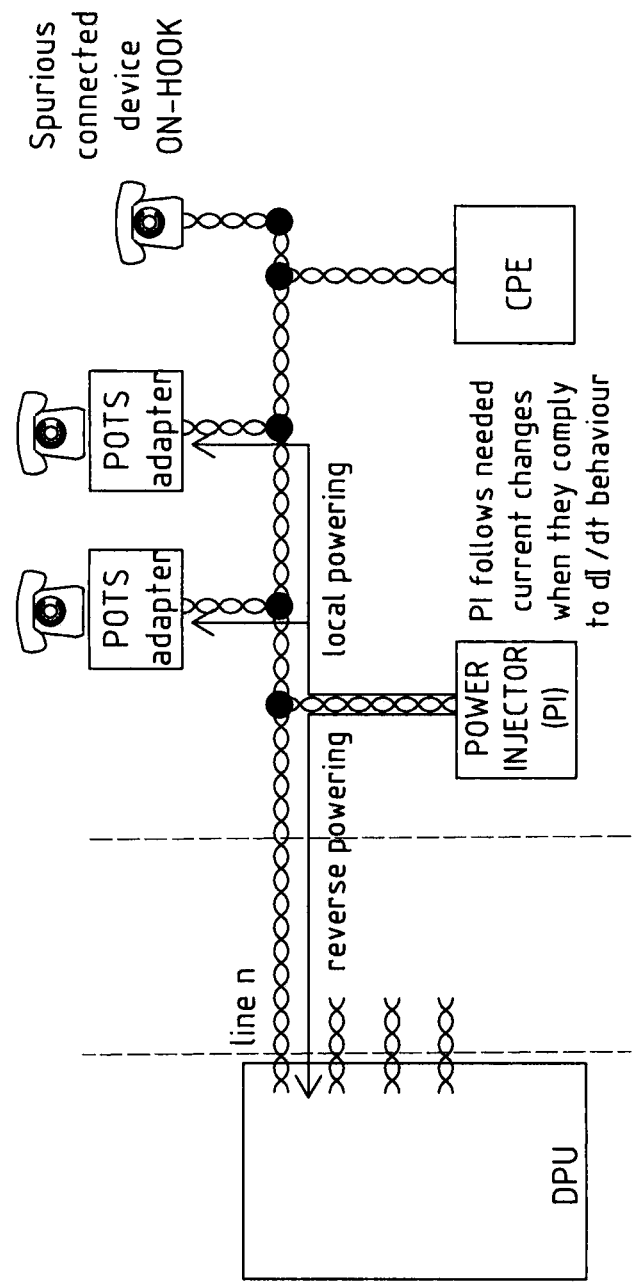
Figure 3B:
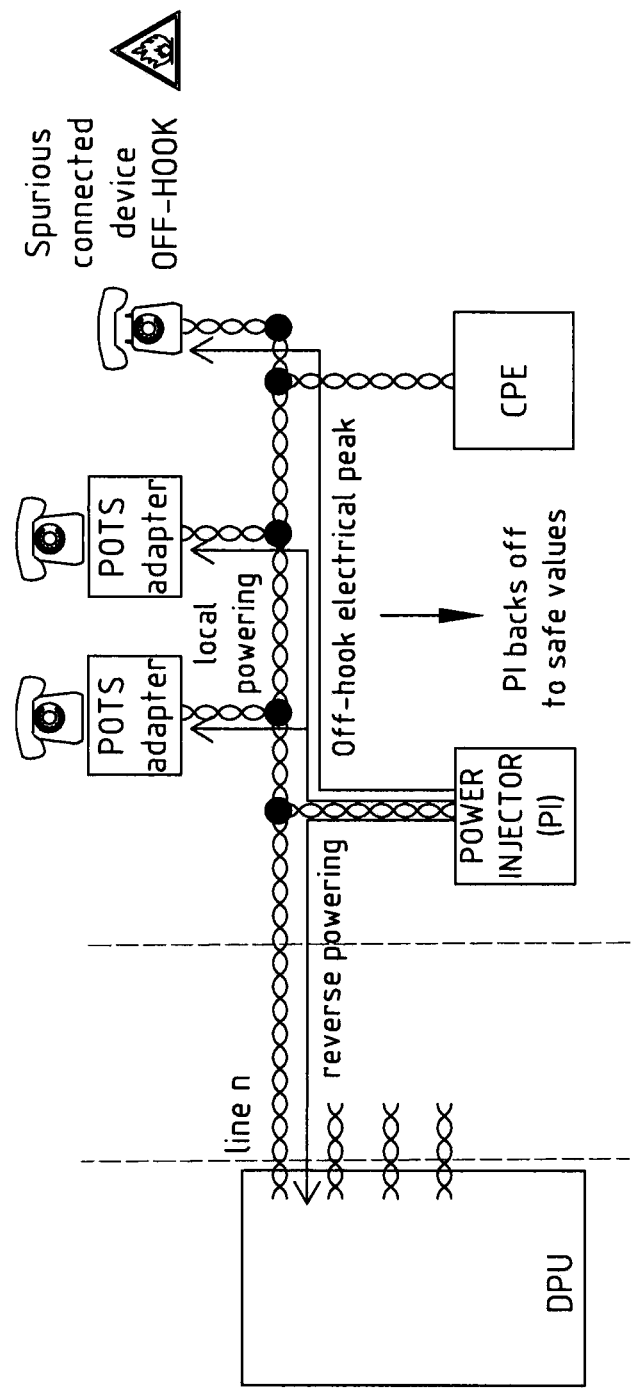

FIG. 3 illustrates an operational phase of the PI 23 injecting reverse power in the DPU 10. The PI 23 injects operational power into the line 21 with a potentially harmful voltage for a spurious connected off-hook device 25. This power flows to the DPU 10 and to any regularly connected devices 24 that are present. In case of a spurious connected phone in an on-hook situation, the on-hook phone does not take current from the line and does not need to be detected. The PI 23 continues to inject current for the DPU 10 and any regularly connected devices 24. Note that during operation, additional devices may be connected or disconnected, as long as their electrical characteristics are recognized by the PI 23 as normal characteristics. Power needs may vary over time, and the DPU may request an increase or decrease in current. As these events happen in a controlled way over time this will be allowed by the PI. When an anomalous connected device 25 comes off-hook, its current consumption being of a resistive nature will cause a sudden uncontrolled peak, meaning it will trigger a different variation in electrical characteristic at the PI 23 than the controlled variation for a DPU or a regularly connected device 24. The PI 23 recognizes this abnormal behavior, goes into an alarm modus and reverts to safe values. This will prevent the hazard on the wrongly connected apparatus. In case of a phone, optionally the same howler tone signaling as at startup can be applied. When off-hook status disappears, the power injector can revert to normal operation.

Figure 4:
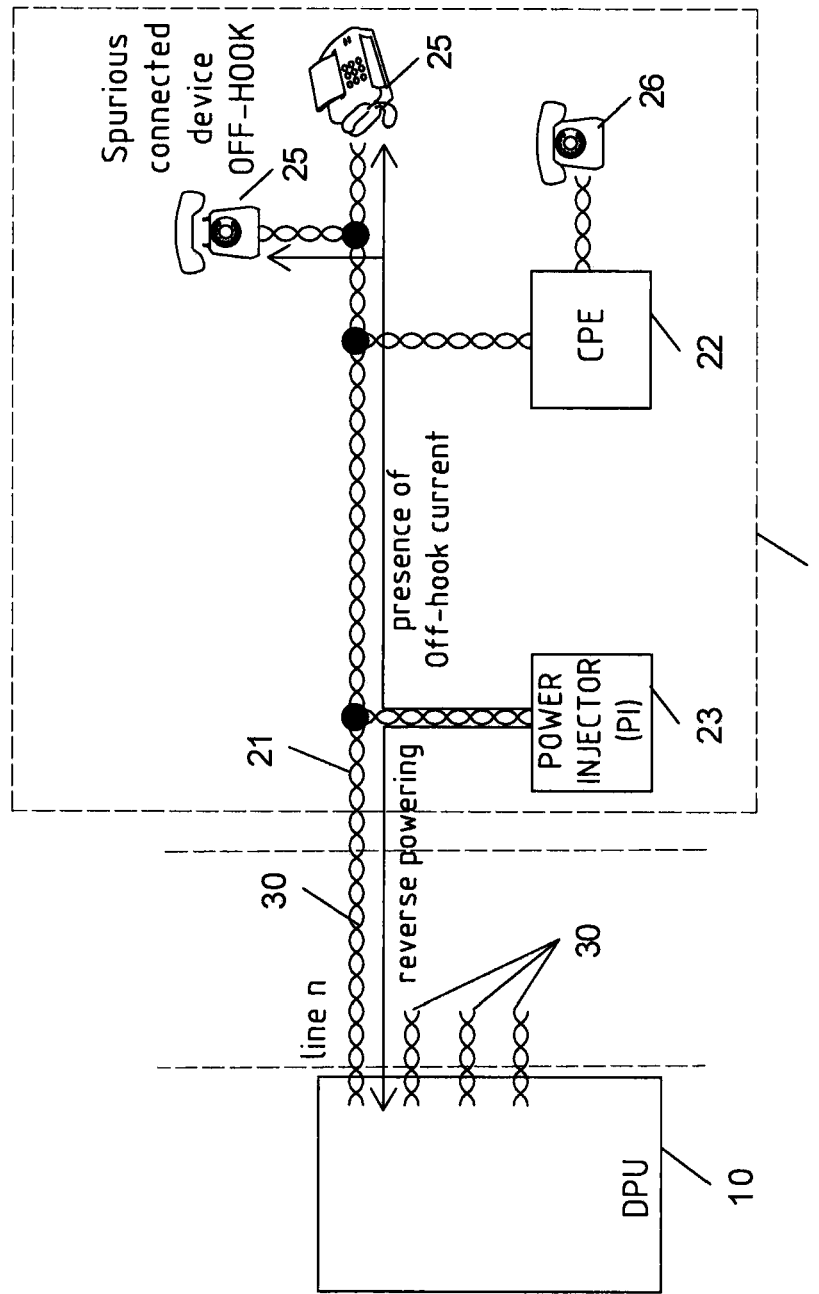
FIG. 4 illustrates schematically a second embodiment of a method and system.

FIG. 4 illustrates another example of an architecture in which embodiments of the invention may be used. In the illustrated example there are not used any POTS adapters, but voice is delivered in the form of VoIP to the CPE 22 and in POTS format from the CPE 22 to a plain telephone 26, i.e. the CPE 22 converts and injects POTS on separate interface(s). There are shown two anomalous connected devices 25, a telephone and a fax. If any one of those devices 25 is off-hook the scenario disclosed above in connection with FIGS. 1-3 may be performed.

Figure 5:
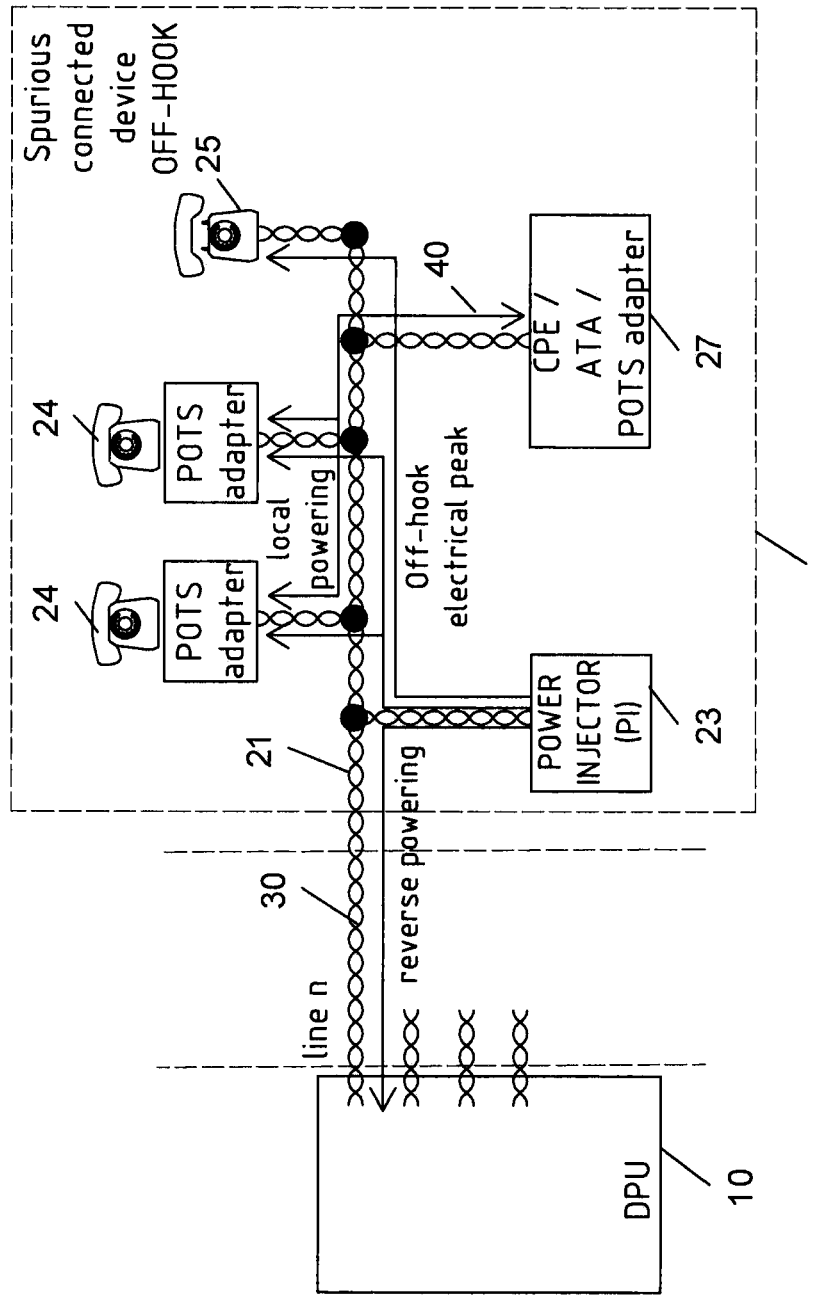
FIG. 5 illustrates schematically a second embodiment of a method and system.

FIG. 5 illustrates yet another example of an architecture in which embodiments of the invention may be used. In this embodiment the CPE 22 is provided with VoIP and comprises a POTS adaptor for generating a suitable signal that can be reinjected in the communication line, see arrow 40. In the other direction, POTS signals from the telephones 24 are converted by the associated POTS adaptors and received by the CPE, see arrow 40. These signals are then converted in VoIP signals, and sent over the communication line 21, 30 to the DPU 10. The other components of the system of FIG. 5 are similar to the components of the first embodiment.

Embodiments of the invention offer the required level of protection for spurious devices or conditions in a reverse powering context since it is possible to detect any number and any kind of spurious connected devices, in the presence of any number of genuine connected devices, at any point in time, i.e. both during start-up of reverse powering and during operation. Further, embodiments of the invention are flexible in the sense that they allow the re-use of any existing home network. Moreover, embodiments of the invention are efficient in the sense that they allow injecting power to its full extent as long as no anomalous situation is detected.

Advantages of embodiments of the invention are that there is no need to know the absolute power consumption and the amount of genuine devices 24 that are connected, there is no need for a special communication (signaling) between the genuine devices 24 and the power injector 23.

Embodiments of the invention provide an excellent device safety protection in the context of reverse powering of remote devices and allow re-using any existing home network. There is no need to install a central device in a central point, the power injector can be self-installed and connected at any home network socket, and is fool-proof against users mistakenly keeping or plugging legacy phones/faxes in their home network and taking them off-hook. This may be relevant for all scenarios independently of the voice delivery method: POTS end-end (=from the CO to the phones), VoIP to the CPE and POTS from the CPE to the phones (CPE converts and injects POTS into home wiring network), or even pure VoIP to an ATA device with directly attached phones (no re-use of the existing home wiring network for POTS).

Whilst the principles of the invention have been set out above in connection with specific embodiments, it is to be understood that this description is merely made by way of example, and not as a limitation of the scope of protection which is determined by the appended claims.

The invention claimed is:

1. Method for dealing with an anomalous condition in a local network including a power injector, said method comprising:
    connecting the power injector to a communication line extending between the local network and a remote device, the local network including customer premise equipment and the remote device being outside of the local network, said power injector being capable of injecting power on the communication line, for reverse powering a remote device located outside the local network, and for powering any local device that is regularly connected to the communication line;
    said communication line being used for exchanging data between the remote device and the local network;
    recognizing when a power consumption behavior of the power injector deviates from a characteristic power consumption behavior of said remote device and of any regularly connected local device; and
    controlling the power injector when a deviation is recognized.

2. Method of claim 1, wherein controlling the power injector comprises ensuring that the injected power is below a predetermined level within a predetermined time period.

3. Method of claim 1, wherein a current and/or voltage and/or power behavior in the local network over time is measured, and wherein a deviation is recognized when a change over time of the current and/or voltage and/or power rises above a critical value.

4. Method of claim 1, wherein said recognizing is done at the power injector.

5. Method of claim 1, wherein the anomalous condition is caused any one of the following:
    by a communication device that is directly connected to the communication line;
        said communication device having an on-hook and an off-hook modus, wherein a deviation is recognized when the communication device is in the off-hook modus and draws power from the power injector;
    by a short-circuit at a connection point of the communication line;
    by a device that is being connected to a connection point of the communication line in which the consumed power increases faster than a predetermined threshold upon powering the communication line.

6. Method of claim 1, further comprising, at the power injector:
    receiving information concerning the power needed by the remote device, from the remote device; and
    taking into account said information for recognizing when a power consumption behavior of the power injector deviates from a characteristic power consumption behavior of said remote device.

7. Method of claim 1, wherein the communication line is a metallic-pair cable.

8. Method of claim 1, wherein the power injector monitors the change over time of the injected current or power for recognizing a deviation.

9. Method of claim 1, wherein said recognizing is performed during start-up of the power- injector, and said controlling consists in not allowing a startup of the power injector to full power; and/or wherein said recognizing is performed continuously during normal operation of the power-injector, and said controlling comprises limiting the injected power to predetermined safe values.

10. Method of claim 1, wherein the remote device is a fibre-fed remote node; and/or
    wherein communication signals including broadband signals and/or converted POTS signals are exchanged through the communication line, between the remote device and the local network.

11. The method of claim 2, wherein the recognizing when the power consumption behavior of the power injector deviates from a characteristic power consumption behavior includes measuring a behavior of at least one of an injected current, an injected voltage, and an injected power, and the controlling the power injector to ensure that the injected power is below a predetermined level includes the power injector reducing the injected power to at least one of a safe injected current, a safe injected voltage and a safe injected power.

* * * * *